(12) United States Patent
Menard et al.

(10) Patent No.: US 10,882,597 B2
(45) Date of Patent: Jan. 5, 2021

(54) IMPACT RESISTANT FUSELAGE

(71) Applicant: AIRBUS OPERATIONS S.L., Getafe (ES)

(72) Inventors: Edouard Menard, Getafe (ES); Esteban Martino González, Getafe (ES); Fernando Iniesta Lozano, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 308 days.

(21) Appl. No.: 15/921,399

(22) Filed: Mar. 14, 2018

(65) Prior Publication Data

US 2018/0281917 A1    Oct. 4, 2018

(30) Foreign Application Priority Data

Mar. 15, 2017 (EP) .................................. 17382132

(51) Int. Cl.
*B64C 1/06* (2006.01)
*F41H 5/04* (2006.01)

(52) U.S. Cl.
CPC ............ *B64C 1/068* (2013.01); *B64C 1/06* (2013.01); *B64C 1/062* (2013.01); *F41H 5/0471* (2013.01)

(58) Field of Classification Search
CPC .. B64D 7/00; B64D 45/00; B64D 2045/0095; B64C 1/06; B64C 1/062; B64C 1/068; B64C 1/10; E06B 5/10; E06B 9/0692
See application file for complete search history.

(56) References Cited

U.S. PATENT DOCUMENTS

| | | | | |
|---|---|---|---|---|
| 3,443,824 A | * | 5/1969 | Dietrich | B60R 21/06 280/749 |
| 5,031,862 A | * | 7/1991 | Rhodes | B64C 1/068 244/117 R |
| 6,460,299 B1 | * | 10/2002 | Burrow | E06B 9/0692 49/466 |

(Continued)

FOREIGN PATENT DOCUMENTS

| EP | 2514671 | 10/2012 |
|---|---|---|
| EP | 2610164 | 7/2013 |

(Continued)

OTHER PUBLICATIONS

European Search Report, dated May 11, 2017, priority document.

*Primary Examiner* — Joseph W Sanderson
(74) *Attorney, Agent, or Firm* — Greer. Burns & Crain. Ltd.

(57) ABSTRACT

An impact resistant fuselage of an aircraft, the fuselage extending along a central longitudinal direction, wherein transversal sections of the fuselage are comprised in a vertical plane perpendicular to the central longitudinal direction. The impact resistant fuselage comprises at least a ballistic material membrane extended along the longitudinal direction for absorbing high energy impacts. The membrane according to a transversal section, comprising at least one section between two tensional elements, wherein the material membrane is located inside the fuselage of the aircraft, the at least one section of the membrane is mechanically linked to the inside of the fuselage by the tensional elements, and the two tensional elements stress the membrane.

11 Claims, 4 Drawing Sheets

(56) References Cited

U.S. PATENT DOCUMENTS

| | | | |
|---|---|---|---|
| 6,612,217 B1 * | 9/2003 | Shockey | B32B 5/02 244/121 |
| 8,528,864 B2 * | 9/2013 | Villanueva Montero | F41H 5/06 244/129.1 |
| 8,573,538 B2 * | 11/2013 | Verde Preckler | B64C 1/068 244/121 |
| 8,678,314 B2 * | 3/2014 | Martino Gonzalez | B64C 1/06 244/119 |
| 8,777,160 B2 * | 7/2014 | Dazet | B64C 1/10 244/119 |
| 8,960,603 B2 * | 2/2015 | Santolalla | B64C 1/061 244/119 |
| 9,359,085 B2 * | 6/2016 | Folch Cortes | B64C 1/06 |
| 9,371,126 B2 * | 6/2016 | Siemetzki | B64C 1/062 |
| 9,702,665 B1 * | 7/2017 | Rose, Jr. | F41H 5/24 |
| 10,059,425 B2 * | 8/2018 | Vetter | B64D 11/0023 |
| 10,286,993 B2 * | 5/2019 | Vazquez Castro | B64C 1/10 |
| 2008/0308676 A1 | 12/2008 | Muller | |
| 2009/0140096 A1 * | 6/2009 | Verde Preckler | B64C 1/068 244/55 |
| 2012/0156420 A1 | 6/2012 | Greiner | |
| 2013/0078049 A1 | 3/2013 | Bistuer et al. | |
| 2013/0099057 A1 * | 4/2013 | Martino Gonzalez | B64C 1/06 244/121 |
| 2013/0119201 A1 | 5/2013 | Villanueva Montero | |
| 2013/0214090 A1 | 8/2013 | Folch Cortes et al. | |
| 2015/0321744 A1 * | 11/2015 | Vetter | B64C 1/34 244/118.5 |
| 2017/0158304 A1 * | 6/2017 | V Zquez Castro | B64C 1/34 |
| 2018/0022435 A1 * | 1/2018 | Grip | B64C 1/08 |
| 2018/0346121 A1 * | 12/2018 | Corbett | B60P 7/14 |

FOREIGN PATENT DOCUMENTS

| | | | | |
|---|---|---|---|---|
| EP | 2886444 A1 * | 6/2015 | | B64C 1/10 |
| WO | WO 8100836 A * | 4/1981 | | B64C 1/10 |

* cited by examiner

IMPACT RESISTANT FUSELAGE

CROSS-REFERENCES TO RELATED APPLICATIONS

This application claims the benefit of the European Patent Application No. 17382132.3 filed on Mar. 15, 2017, the entire disclosure of which are incorporated herein by way of reference.

FIELD OF THE INVENTION

The present invention belongs to the field of aircraft structures and aircraft protection against threat of high energy impacts, more particularly, to the field of an impact resistant fuselage of an aircraft.

The present invention discloses an impact resistant fuselage of an aircraft, such impact resistant fuselage comprising at least a ballistic material membrane being located inside the aircraft fuselage.

BACKGROUND OF THE INVENTION

There are known aircraft equipped with engines configurations such as Open Rotor (OR) or Turbofan. In these aircraft, potential hazardous events occur such as a Propeller Blade Release (PBR) event, i.e., an event where an external blade of one engine comes off and hits the fuselage, or an Uncontained Engine Rotor Failure (UERF) event, i.e., an event where a part of the internal rotor of the engine breaks off, it is released and hits some aircraft structures, i.e., fuselage, vertical stabilizer, horizontal stabilizer, generating large damages on these aircraft structures.

Although engine manufacturers are making efforts to reduce the probability of these failure events, experience shows that PBR and UERF events that can lead to catastrophic events continue to occur.

In terms of protection for UERF events, there are protections applied in order to minimize the hazards of an engine or Auxiliary Power Unit (APU) rotor failures. Additionally, a particular protection is applied on fuel tanks if they are located in impact areas, in order to minimize the possibility of fuel tank damage. The shielding of Aluminum or Titanium is typically used for these events.

As it is well known, weight is a fundamental aspect in the aeronautic industry and therefore there is a trend to use structures of a composite material instead of a metallic material even for primary structures such as fuselages. The usual composite materials made of carbon fibers, compared to conventional light weight metallic materials, presents a lower impact resistance due to lower out of plane properties and damage tolerance capabilities. Also, no plasticity behavior as on metallic materials is present in composite materials and they are not able to absorb high strain energy amounts when deforming.

Depending on the threat, the most widely spread ballistic composite armors are typically composed of layers of different materials, such as metal, fabrics and ceramics or by sole fabrics of materials with good ballistic performance, also called "dry" fabrics.

The unpressurized area of an aircraft is arranged at the back of an aircraft, and the fuselage housing that area is exposed to Propeller Blade Release (PBR) and Uncontained Engine Rotor Failure (UERF) events. Also, due that the APU is located in such unpressurized area of the aircraft, the fuselage of this area needs to be protected in order to minimize the risks of an impact damaging the fuselage structure and reaching the APU inside the aircraft.

Thus, there is a need for unpressurised fuselage structures able to satisfy the safety requirements and ballistic performance particularly when they are made up of composite materials.

SUMMARY OF THE INVENTION

The present invention provides an alternative solution for the aforementioned problems, by an impact resistant fuselage according to the claims and an aircraft according to the claims. In dependent claims, preferred embodiments of the invention are defined.

In a first inventive aspect, the invention provides an impact resistant fuselage of an aircraft, the fuselage being extended along a central longitudinal direction X-X', wherein transversal sections of the fuselage are comprised in a vertical plane V which is perpendicular to the central longitudinal direction X-X', the impact resistant fuselage comprises at least a ballistic material membrane extended along the longitudinal direction X-X' for absorbing high energy impacts, the at least ballistic material membrane according to a transversal section, comprises at least one section between two tensional elements,
wherein
the at least ballistic material membrane is located inside the fuselage of the aircraft,
the at least one section of the ballistic material membrane is mechanically linked to the inside of the fuselage by the tensional elements, and
the two tensional elements stress the ballistic material membrane.

Throughout this entire document, "central longitudinal direction X-X'" will be understood as the direction that the longitudinal axis of an aircraft passing through a central point of a section of the fuselage. That is, the central longitudinal direction X-X' will be understood as the direction from the aircraft tail's cone to the nose.

The vertical plane V is perpendicular to the central longitudinal direction X-X' in such a way that any transversal section of the aircraft fuselage is parallel to the vertical plane V.

In a particular embodiment, according to a transversal section of the present aircraft fuselage, the ballistic material membrane comprises at least one section between two tensional elements. Additionally, the at least one section of the ballistic material membrane is linked to the inside of the fuselage by the tensional elements, that is, the "section" will be understood as a part of the ballistic material membrane between the tensional elements.

Throughout this entire document, "tensional elements" will be understood as mechanical elements which keep the ballistic material membrane tight between the at least one section of the ballistic material membrane. Thus, according to any embodiment of the present invention, these tensional elements contribute to ensuring the tensional state of the ballistic material membrane. Additionally, the tensional elements are in mechanically link the at least one section of such ballistic material membrane. Furthermore, throughout this document, "mechanically linked" will be understood as a mechanical connection between elements. Thus, in the present invention, the tensional elements are understood also as mechanical connection elements which link the ballistic material membrane to the inside of the aircraft fuselage.

Advantageously, the present ballistic material membrane installed inside the fuselage very efficiently protects an area of the aircraft in case of suffering an impact. Additionally, when the impact reaches the ballistic material membrane, part of the impact energy is absorbed by the ballistic material membrane thanks to its arrangement thus preventing that the impact reaches, for instance, relevant components or systems such as the APU among other components located inside the unpressurized area. Thus, the ballistic material membrane advantageously absorbs the impact energy thanks to the elastic deformation of such membrane, the resilience of the tensional element or thanks to both features.

In a particular embodiment, the impact resistant fuselage further comprises a plurality of ballistic material membranes extended along the longitudinal direction X-X' for absorbing high energy impacts, each ballistic material membrane according to a transversal section, comprises at least one section between two tensional elements. The plurality of ballistic material membranes is located inside the fuselage of the aircraft. The at least one section of each ballistic material membrane is mechanically linked to the inside of the fuselage by the tensional elements, wherein the tensional elements stress the ballistic material membrane. Also, the plurality of ballistic material membranes is arranged in a way free to contact each another.

In a more particular embodiment, the plurality of ballistic material membranes is arranged in such a way that each ballistic material membrane is parallel to each another.

Advantageously, the plurality of ballistic material membranes arranged inside the fuselage possibly provides a plurality of zones/portions inside the fuselage. Additionally, the fact that the ballistic material membranes are extended in a way free to contact each other allows each membrane to act freely and independently to be able to absorb as much impact energy as possible in the most efficient way. Thus, each ballistic material membrane works independently, while the set of sections of each ballistic material membrane work together.

According to an embodiment, impact energy is absorbed by all segments in an elastic manner because the stress is being transmitted through the tensional elements; however, as each membrane acts freely and independently, the impact energy is directly transmitted to a first membrane, which may cause the tearing of its tensional elements, or the impact energy may be also transmitted to a second or even more membranes depending on the total energy of the impact.

In a particular embodiment, the tensional elements are end tensional elements which mechanically link the at least one section of the ballistic material membrane in a zone of the ballistic material membrane which is substantially closer to opposite ends of the ballistic material membrane. That is, according to preferred embodiments, a material membrane comprises one or more consecutive sections wherein two adjacent sections are being linked by means of at least one tensional element. This set of consecutive sections has two end sections, the first section and the last section, wherein each of the end sections has a free end where the end tensional element is located. As a result, the two end tensional elements are located at opposite end of the ballistic material membrane.

In a particular embodiment, the ballistic material membrane is provided extended along the longitudinal direction X-X' and, according to a transversal section, it comprises two opposite ends. In a more particular embodiment, the ballistic material membrane comprises at least a section arranged between such opposite ends of the ballistic material membrane. In another particular embodiment, the ballistic material membrane comprises a plurality of sections between the opposite ends of the ballistic material membrane.

The end tensional elements, in addition to keeping the ballistic material membrane tight between its opposite ends or between the zone of the ballistic material membrane that is in contact with the inside of the fuselage by the end tensional elements, are also configured to link the ballistic material membrane in a way that, advantageously, in case of impact the end tensional elements support the deformation of the membrane preventing it from breaking.

The fact that the ballistic material membrane is linked to the inside of the fuselage allowing the links to be mechanical elements whereby the ballistic material membrane is attached to inside the fuselage, and also the links can break or retain the ballistic material membrane attached to the inside of the fuselage.

In a particular embodiment, the end tensional elements are fixing supports which are joined to the inside of the fuselage, in such a way that the fixing supports fix the ballistic material membrane to the inside of the fuselage.

In a more particular embodiment, the tensional elements are joined to an inner structure of the aircraft fuselage.

The fixing supports, advantageously, allow maintaining the ballistic material membrane fixed inside the fuselage. In a more particular embodiment, such fixing supports fix the ballistic material membrane in its ends to the inner structure of the fuselage, i.e., frames, stringers, ribs, inner skin.

In another particular embodiment, the end tensional elements show resilience properties, for example, comprising elastic deformable elements.

In another particular embodiment, the end tensional elements are tearable joints. In a more particular embodiment, such tearable joint joins the ballistic material membrane in its ends to the inner structure of the fuselage, i.e., frames, stringers, ribs, inner skin.

The tearable joint is a progressively tearable joint in such a way that, advantageously, the joint allows the ballistic material layer to easily tear from the inner structure of the fuselage while absorbing energy from the impact. Additionally, when an impact occurs and the ballistic material membrane tears down, the structural elements of the fuselage are not damaged.

In a more particular embodiment, the tearable joint is preferably a line of fuse rivets. Throughout this entire document, "fuse rivet" will be understood as a joint which comprises rivets or fasteners which are easy to tear if the ballistic material membrane does not support the impact energy or the amount of energy to absorb is too high. In another embodiment, the tearable joint is a bonded joint between the ballistic material membrane and the inner structure of the fuselage.

In a particular embodiment, the end tensional elements are rotating supports which are joined to the inside of the fuselage, such rotating supports comprise a sliding surface with which the ballistic material membrane is in contact in such a way that the ballistic material membrane is arranged in a sliding manner around the sliding surface, and the ballistic material membrane is fixed in its opposite ends to the inside of the fuselage.

Advantageously, the fact that the ballistic material membrane is fixed in its opposite ends to the inside of the fuselage allows that, when an impact occurs, the ballistic material layer can slide on the sliding surface of the rotating supports.

In a particular embodiment, the impact resistant fuselage further comprises at least one intermediate tensional element providing a plurality of sections of the ballistic material membrane. Additionally, the at least one intermediate tensional element is located between a pair of consecutive sections of the ballistic material membrane such that the sections are arranged in a way free to contact each other.

The arrangement of such intermediate tensional elements, advantageously, allows each section of the ballistic material membrane be tight between them in such a way that, thanks to the intermediate tensional elements and the end tensional elements, the whole ballistic material membrane is tight between its opposite ends.

In a particular embodiment, the intermediate tensional elements are:
  rotating supports located between a pair of consecutive sections and joined to the inside of the fuselage, such rotating supports comprise a sliding surface with which the ballistic material membrane is in contact in such a way that the ballistic material membrane is arranged in a sliding manner around the sliding surface,
  fixing supports located between a pair of consecutive sections and joined to the inside of the fuselage, in such a way that the fixing supports fix each of the two fixed sections of the ballistic material membrane to the inside of the fuselage,
  tearable joints located between a pair of consecutive sections, preferably a line of fuse rivets, or
  any combination of them.

According to the arrangement of the ballistic material membrane around the sliding surface of the rotating support, if an impact occurs, friction is generated due to the slippage of the ballistic material membrane around the sliding surface of the support. Thus, advantageously, the friction absorbs part of the impact energy. Furthermore, if an impact occurs, each section of the ballistic material membrane will progressively, elastically deform in such a way that due to the stress transmitted from one section to another, advantageously, the elastic deformation of each section absorbs part of the impact energy.

In the particular embodiment wherein the ballistic material membrane is fixed to inside the fuselage by fixing supports, due to the ballistic material membrane being fixed to inside the fuselage between each section, if an impact occurs and a section is perforated, then the impact will achieve the following section and so on with the rest of the section. Thus, particularly, the fixing provides a support between sections of the ballistic material membrane, advantageously, allows that if one of the sections is perforated, absorbing part of the impact energy, the following section will keep the stress, resist the impact, and absorb part of the impact energy by its elastic deformation.

In the particular embodiment wherein the end tensional elements or the intermediate tensional elements are tearable joints, due to the ballistic material membrane being joined by a line of fuse rivets to inside the fuselage between each section, if an impact occurs and a section does not support the impact energy and is teared, then the impact will achieve the following section and so on with the rest of the sections. Thus, particularly providing a line of fuse rivets between sections of the ballistic material membrane, advantageously, allows that if one of the sections is teared absorbing part of the impact energy, the following section will resist the impact and absorb the impact energy by its elastic deformation.

In another particular embodiment, the plurality of sections of the ballistic material membrane is arranged in such ways that such sections are parallel between them.

In a particular embodiment, the ballistic material membrane comprises at least two sections between the tensional elements in such a way that such tensional elements are intermediate tensional elements and the ballistic material membrane defines a closed space. In a more particular embodiment, the fuselage comprises a plurality of ballistic material membranes comprising at least two sections between the tensional elements in such a way that such tensional elements are intermediate tensional elements and each ballistic material membrane defines a closed space.

In another particular embodiment, the resistant fuselage further comprises at least one intermediate tensional element providing a plurality of sections of the ballistic material membrane, and the at least one intermediate tensional element being located between a pair of consecutive sections of the ballistic material membrane such that the sections are arranged in a way free to contact each other.

The arrangement of at least one ballistic material membrane defining a closed space inside the fuselage allows, advantageously, that substantially all the inside of the closed space is protected from impacts.

In a particular embodiment, the intermediate tensional elements are:
  rotating support located between a pair of consecutive sections and joined to the inside of the fuselage, such rotating supports comprise a sliding surface with which the ballistic material membrane is in contact in such a way that the ballistic material membrane is arranged in a sliding manner around the sliding surface,
  fixing support located between a pair of consecutive sections and joined to the inside of the fuselage, in such a way that the fixing supports fix each of the two fixed sections of the ballistic material membrane to the inside of the fuselage,
  tearable joints located between a pair of consecutive sections, preferably a line of fuse rivets, or
  any combination of them.

In a particular embodiment, the ballistic material membrane is intended for receiving impacts. Thus, when an impact perforates the composite material of the fuselage and goes inside the fuselage, the ballistic material membrane is provided for receiving such impact, and advantageously, is configured to absorb part of the impact energy by its elastic deformation.

In a particular embodiment, the ballistic material membrane is arranged in unpressurized area of the aircraft.

In a second inventive aspect, the invention provides an aircraft comprising an impact resistant fuselage according to the first inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

FIGS. 1 to 2 and 4 to 6 show a schematic view of a transversal section (5) of a fuselage (6) of an aircraft (7), wherein such transversal section (5) is contained in a vertical plane V, the vertical plane V being perpendicular to a central longitudinal direction X-X' of the aircraft (7).

Figure 1:
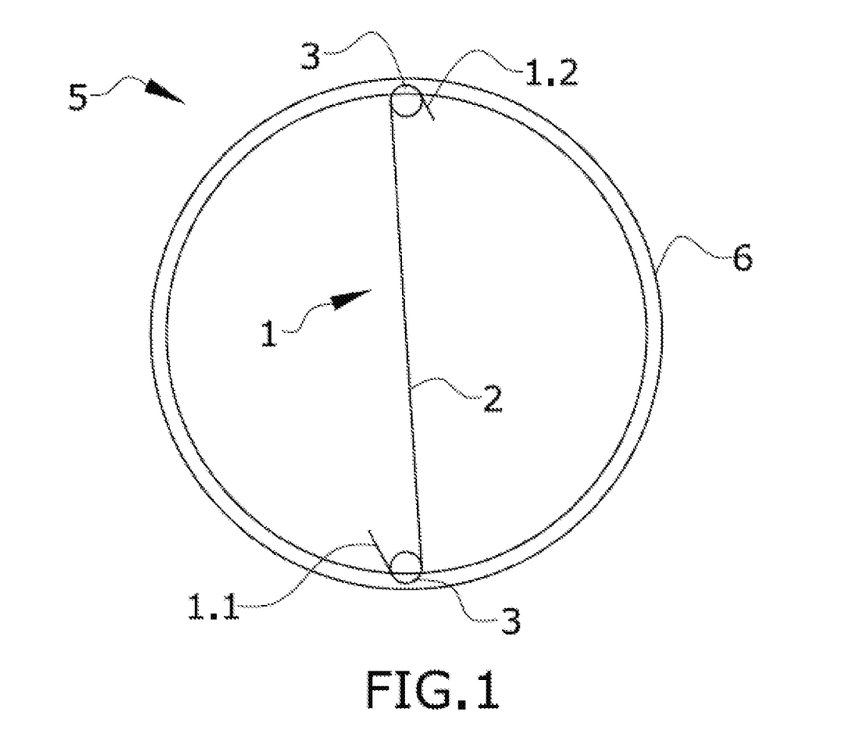
FIG. 1 shows a schematic view of a transversal section of an aircraft fuselage according to an embodiment of the present invention.
Figure 2:
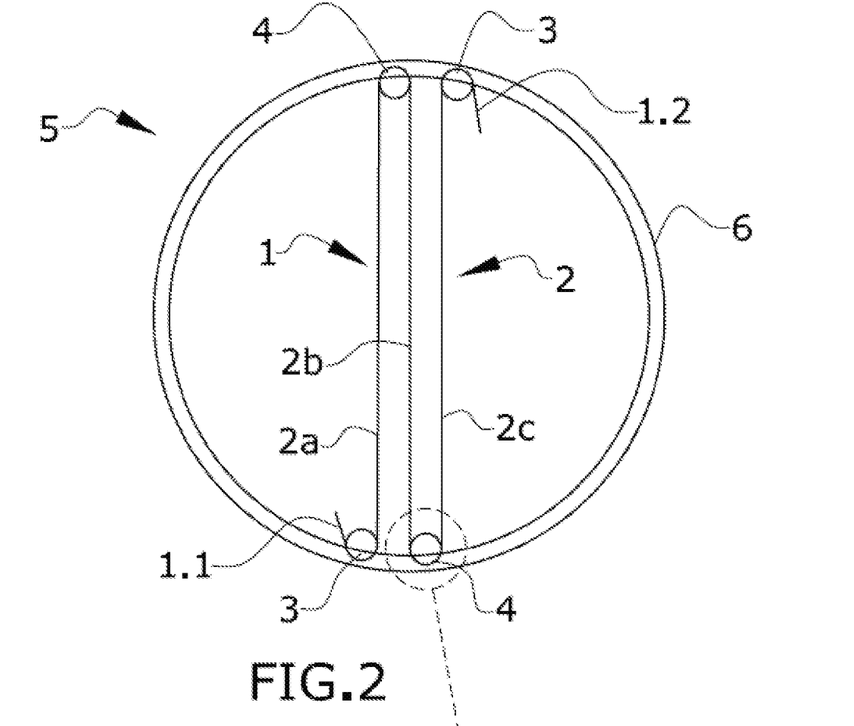
FIG. 2 shows a schematic view of a transversal section of an aircraft fuselage according to an embodiment of the present invention.

In FIGS. 1 and 2, the fuselage (6) comprises a ballistic material membrane (1) for absorbing high energy impacts, which is located inside such fuselage (6). The ballistic material membrane (1) comprises a first opposite end (1.1) and a second opposite end (1.2) which are closer to a zone of the ballistic material membrane (1) wherein the membrane (1) is linked to the inside of the fuselage (6). The mechanically links of the ballistic material membrane (1) to the inside of the fuselage (6) are provided by two end tensional elements (3). As it can be observed, in both FIGS. 1 and 2, the end tensional elements are shown as schematic elements.

In a particular example, the ballistic material membrane (1) is linked to the inside of the fuselage (6) in such a way that the outermost section of the ballistic material membrane (1), that corresponds to the opposite ends (1.1, 1.2), is free of stress.

In FIG. 1, the ballistic material membrane (1) comprises one section (2) between two end tensional elements (3).

In FIG. 2, the present resistant fuselage (6) comprises two tensional elements (3) and two intermediate tensional elements (4) in such a way that the intermediate tensional elements (4) provide a plurality of sections (2). That is, the ballistic material membrane (1) comprises a first section (2a), a second section (2b), and a third section (2c) from the first opposite end (1.1) to the second opposite end (1.2). Each intermediate tensional element (4) is arranged between each pair of consecutive sections (2; 2a, 2b, 2c) of the ballistic material membrane (1). As it can be observed in FIGS. 2, 3 and 4, the intermediate tensional elements (4) are shown as schematic elements. Such intermediate tensional elements (4) are configured to maintain the ballistic material membrane (1) also linked to the inside of the fuselage (6) between each pair of consecutive section (2) of the ballistic material membrane (1).

Figure 3:
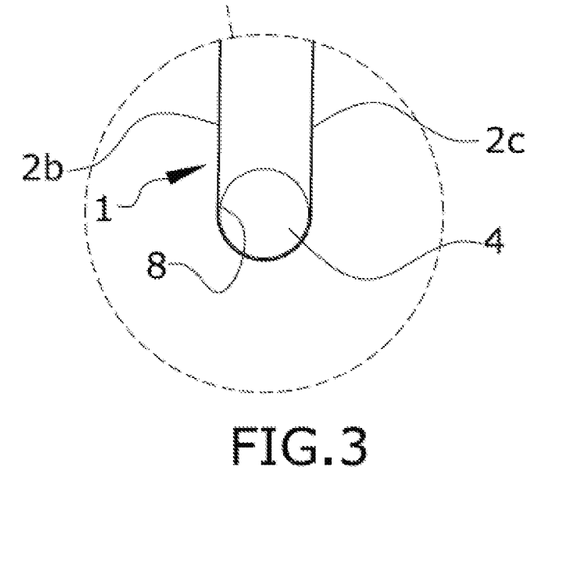
FIG. 3 shows a detail schematic view of an intermediate tensional element according to an embodiment of the present invention.

In a particular example, the intermediate tensional elements (4) are rotating supports which are joined to the inside of the fuselage (6) and configured to allow the ballistic material membrane (1) to slide around a sliding surface (8) of the rotating support (shown in FIG. 3).

Additionally, FIG. 3 shows a detailed view of how a ballistic material membrane (1) is arranged around an intermediate tensional element (4) which is a rotating support. The rotating support has a sliding surface (8) over which the ballistic material membrane (1) slides.

According to FIG. 2, in another particular example, wherein the intermediate tensional elements (4) are fixing supports or tearable joint, when an impact occurs and penetrates the first section (2a), the rest of sections (2b, 2c) of the ballistic material membrane (1) maintain the ballistic material membrane (1) joined inside the fuselage (6) thanks to the intermediate tensional elements (4). Thus, when an impact element penetrates the first section (2a) of the ballistic material membrane (1), the present configuration of the intermediate tensional elements (4) allows the consecutive section, in particular, the second section (2b) to receive the impact element. And if the impact element also penetrates the second section (2b) of the ballistic material membrane (1), the ballistic material membrane (1) is adapted to resist to the impact and to absorb at least part of the energy. In such a way that when the impact element penetrates both first and second section (2a, 2b) of the ballistic material membrane (1), the third section (2c) will receive such impact. In this particular example, once the impact element penetrates the two first sections (2a, 2b) of the ballistic material membrane (1), part of the impact energy is absorbed by each section (2a, 2b) of the ballistic material membrane (1) which has been penetrated by the impact element. So that, the impact element will impact on the consecutive sections (2c) of the ballistic material membrane (1) with less energy than the energy with which the impact element has already impacted on the previously sections (2a, 2b).

Figure 4:
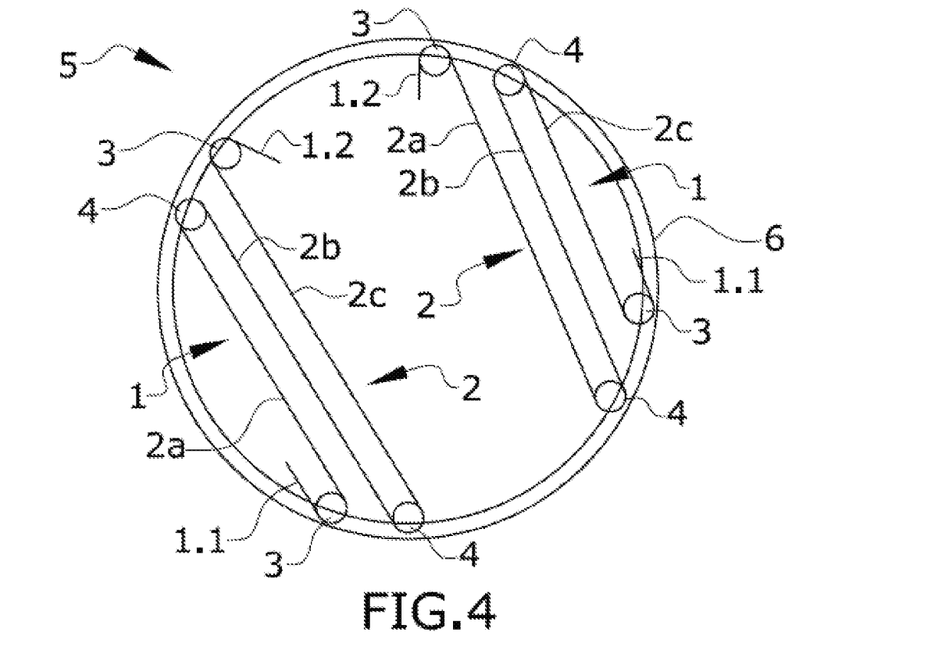
FIG. 4 shows a schematic view of a transversal section of an aircraft fuselage according to an embodiment of the present invention.

In FIG. 4, the resistant fuselage (6) comprises, in its inside, two ballistic material membranes (1) for absorbing high energy impacts. Both ballistic material membranes (1) comprise a first opposite end (1.1) and a second opposite end (1.2), and both ballistic material membranes (1) comprise two end tensional elements in which the ballistic material membranes (1) are anchored inside the fuselage (6). The mechanical links of each ballistic material membranes (1) to the inside of the fuselage (6) are provided by two end tensional element (3) and two intermediate tensional elements.

In this embodiment, two ballistic material membranes (1) are arranged in a similar manner to that shown in FIG. 2 wherein the two ballistic material membranes (1) are located at a smaller arc of the fuselage thus maximizing the protected space at the center and reducing the length of each ballistic material (1). The exact location of the tensional elements (4) depends on engine debris trajectory.

Additionally, FIG. 4 shows each ballistic material membrane (1) comprising a plurality of sections (2) in the same way as shown in FIG. 2. The intermediate tensional elements (4) of both ballistic material membranes (1) provide a first section (2a), a second section (2b) and a third section (2c) from the first opposite end (1.1) to the second opposite end (1.2) of the ballistic material membrane (1). Also, each intermediate tensional element (4) is arranged between each pair of consecutive sections (2; 2a, 2b, 2c) of each ballistic material membrane (1). The arrangement according to this embodiment effectively allows protecting the inner space of the impact resistant fuselage (6) in two opposite sides.

Figure 5:
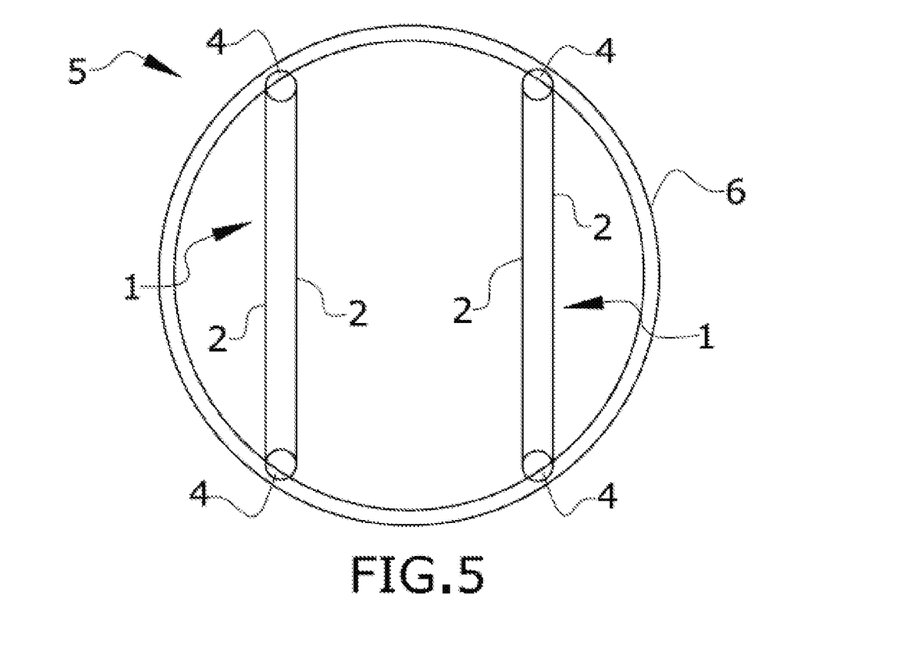
FIG. 5 shows a schematic view of a transversal section of an aircraft fuselage according to an embodiment of the present invention.

FIG. 5 shows a resistant fuselage (6) of an aircraft, wherein the fuselage (6) comprises two ballistic material membranes (1) arranged parallel between them and also extended in a parallel way along the central longitudinal direction X-X'.

Each ballistic material membrane (1) comprises two sections (2). Each section (2) is arranged between two tensional elements which are intermediate tensional elements (4), in such a way that each ballistic material membrane (1) defines a closed space.

Figure 6:
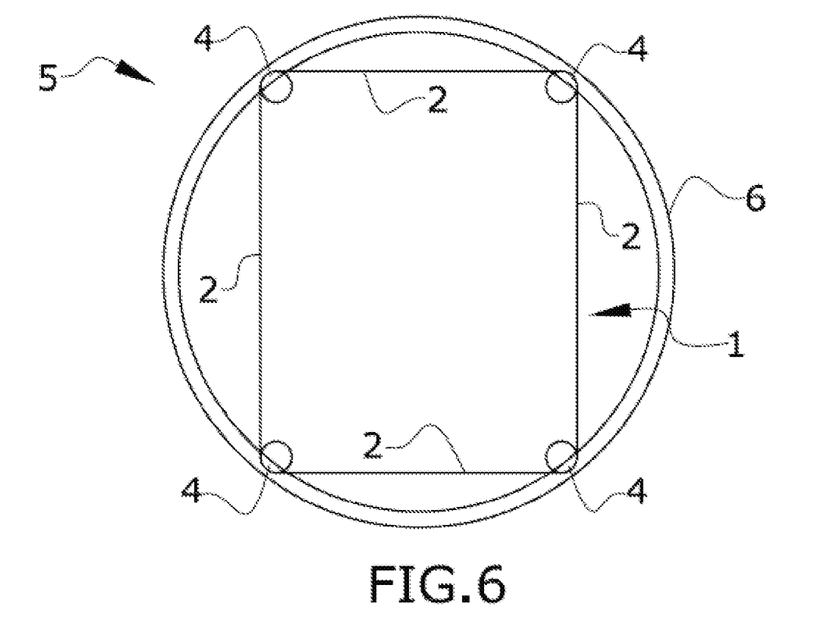
FIG. 6 shows a schematic view of a transversal section of an aircraft fuselage according to an embodiment of the present invention.

FIG. 6 shows a resistant fuselage (6) of an aircraft (7), wherein the fuselage (6) comprises four intermediate tensional elements (4) which provide four sections (2) of the ballistic material membrane (1). Each intermediate tensional element (4) is arranged between each pair of consecutive sections (2) of the ballistic material membrane (1) in such a way that the ballistic material membrane (1) defines a closed space.

Figure 7:
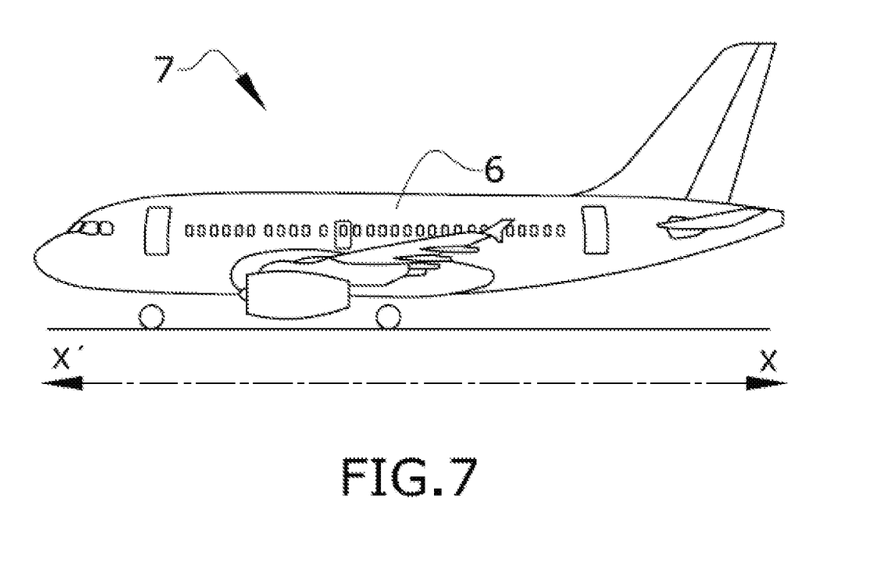
FIG. 7 shows an aircraft according to the present invention.

FIG. 7 shows an aircraft (7) according to the present invention which comprises a fuselage (6) with a ballistic material membrane (1) arranged inside the fuselage (6) (not shown).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An impact resistant fuselage of an aircraft, said fuselage being extended along a central longitudinal direction, wherein transversal sections of the fuselage are comprised in a vertical plane which is perpendicular to the central longitudinal direction, the impact resistant fuselage comprises
at least one ballistic material membrane extended along the longitudinal direction for absorbing high energy impacts, a transversal section of the ballistic material membrane comprises at least one section between two tensional elements, wherein
the ballistic material membrane is located inside the fuselage of the aircraft,
the at least one section of the ballistic material membrane is mechanically linked to the inside of the fuselage by the tensional elements, and
the two tensional elements stress the ballistic material membrane, and wherein the two tensional elements are end tensional elements which mechanically link the at least one section of the ballistic material membrane to the fuselage at opposite ends of the ballistic material membrane, wherein the ballistic material membrane is connected at the opposite ends to the inside of the fuselage, and
at least one intermediate tensional element separates a plurality of sections of the ballistic material membrane, and
said at least one intermediate tensional element is located between a pair of consecutive sections of the ballistic material membrane such that said sections are arranged in a way free to contact each other.

2. The impact resistant fuselage according to claim 1, wherein the impact resistant fuselage comprises a plurality of ballistic material membranes extended along the longitudinal direction for absorbing high energy impacts, a transversal section of each ballistic material membrane comprises at least one section between two tensional elements, wherein
the plurality of ballistic material membranes is located inside the fuselage of the aircraft,
at least one section of each ballistic material membrane is mechanically linked to the inside of the fuselage by the tensional elements, wherein said tensional elements stress said ballistic material membrane, and
the plurality of ballistic material membranes is arranged in a way free to contact each other.

3. The impact resistant fuselage according to claim 1, wherein the ballistic material membrane is fixed to the end tensional elements which are joined to the inside of the fuselage, such that said end tensional elements fix the ballistic material membrane to the inside of the fuselage.

4. The impact resistant fuselage according to claim 1, wherein the end tensional elements are tearable.

5. The impact resistant fuselage according to claim 4, wherein the end tensional elements comprise a line of fuse rivets.

6. The impact resistant fuselage according to claim 1, wherein
the end tensional elements are rotatable and are joined to the inside of the fuselage, such end tensional elements comprise a sliding surface with which the ballistic material membrane is in contact such that said ballistic material membrane is arranged in a sliding manner around the sliding surface, and
the ballistic material membrane is fixed in its opposite ends to the inside of the fuselage.

7. The impact resistant fuselage according to claim 1, wherein the intermediate tensional elements are:
rotatable and located between a pair of consecutive sections of the ballistic material membrane and joined to the inside of the fuselage, such rotatable intermediate tensional elements comprising a sliding surface with which the ballistic material membrane is in contact such that said ballistic material membrane is arranged in a sliding manner around the sliding surface, located between a pair of consecutive sections of the ballistic material membrane and joined to the inside of the fuselage, the intermediate tensional elements fix each of the two fixed sections of the ballistic material membrane to the inside of the fuselage, located between a pair of consecutive sections of the ballistic material membrane and are tearable, or any combination thereof.

8. The impact resistant fuselage according to claim 1, wherein the plurality of sections of the ballistic material membrane is arranged such that each section is parallel to another section.

9. The impact resistant fuselage according to claim 1, wherein the consecutive sections of the ballistic membrane define a closed space.

10. The impact resistant fuselage according to claim 1, wherein the at least one intermediate tensional element comprises:
a rotatable intermediate tensional element located between the pair of consecutive sections and joined to the inside of the fuselage, such rotatable intermediate tensional element comprises a sliding surface with which the ballistic material membrane is in contact such that said ballistic material membrane is arranged in a sliding manner around the sliding surface,
a fixing intermediate tensional element located between a pair of consecutive sections and joined to the inside of the fuselage, such that said fixing intermediate tensional element fixes each of the two fixed sections of the ballistic material membrane to the inside of the fuselage, tearable joints located between a pair of consecutive sections, or any combination thereof.

11. An aircraft comprising an impact resistant fuselage according to claim 1.

* * * * *